July 16, 1946. A. G. TAYLOR 2,404,326
SELF-ADJUSTING MECHANISM FOR HYDRAULIC WHEEL BRAKES
Filed July 18, 1945
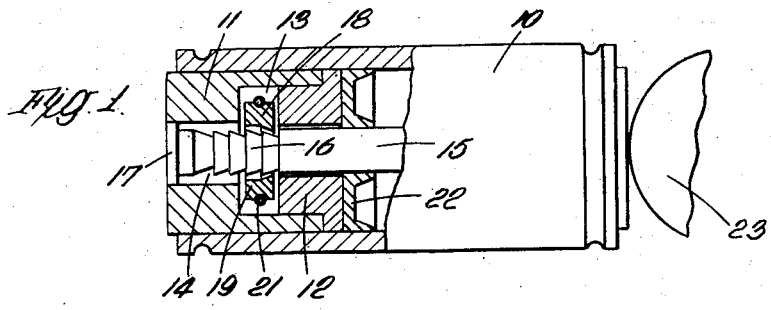
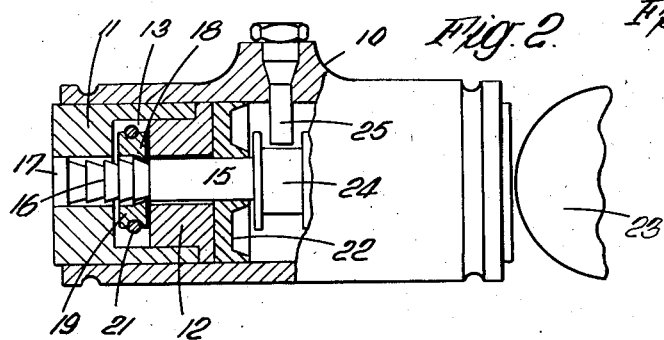
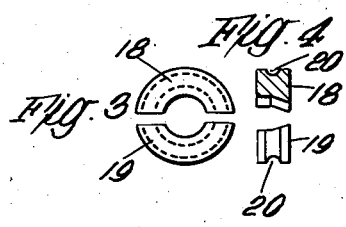
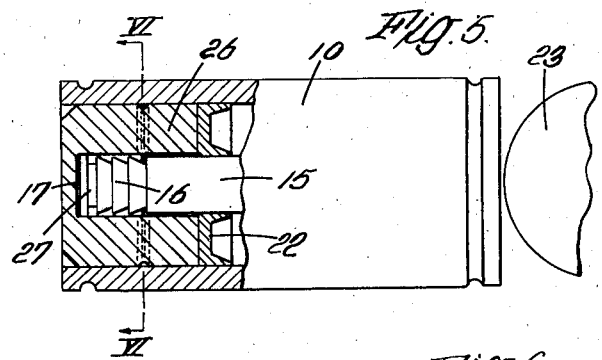
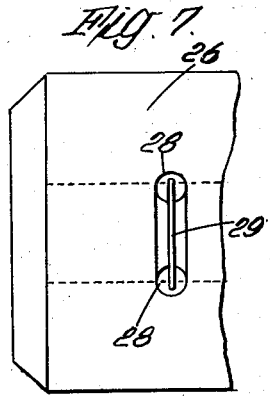
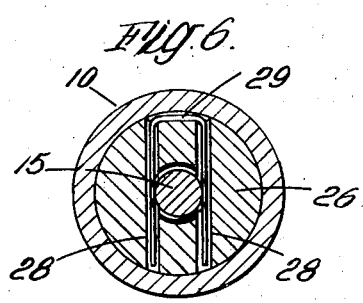
Arthur George Taylor
INVENTOR.
his ATTY.

Patented July 16, 1946

2,404,326

UNITED STATES PATENT OFFICE 2,404,326

SELF-ADJUSTING MECHANISM FOR HYDRAULIC WHEEL BRAKES

Arthur George Taylor, Hadley, Barnet, England, assignor of one-half to F. J. Walker Engineering Company Limited, Barnet, England, a British company Application July 18, 1945, Serial No. 605,727
In Great Britain July 31, 1944

4 Claims. (Cl. 188—79.5)

This invention relates to hydraulically actuated wheel brakes and is particularly concerned with the wheel brakes of motor cars.

Brake mechanisms only have a limited movement and as the brake shoe linings wear down it is necessary at intervals to adjust the actuating mechanism which is often a matter of difficulty where there are several mechanisms, as with the brakes of motor cars, which have to be balanced. It is known that the manual adjustment of brake mechanisms is tedious and hence is often neglected and to obviate this there have been proposals to provide a degree of automatic adjustment in the actuating mechanism. This may be more or less satisfactorily accomplished in rod operated brake mechanisms by means which will vary the length of each operating rod with a degree of play which will avoid binding of the brakes. The problem is more serious with hydraulically operated brakes and automatic adjustment can only be accomplished by providing additional means which act as variable retractive stops. Such additional means complicate the mechanism and as they cannot be placed at the point of maximum movement of shoes due to the hydraulic cylinder there situated they can only give a limited degree of rough adjustment.

The principal object of the present invention is to provide an improved automatic self-adjusting mechanism to compensate for wearing down of the brake linings of a hydraulically actuated brake which is of simple, efficient construction and capable of giving fine adjustment without affecting the design or construction of the brake mechanism or requiring the provision of additional parts. A further object of the invention is to so locate the adjusting means that they are effective at the points of maximum movement of the brake shoes for more certain operation with ample margin of play to avoid binding of the brake shoes.

A further object of the invention is to provide such an adjusting mechanism which is fully self-compensating.

The above and further objects of the invention will be apparent from the following description.

According to the present invention, the or each piston in a cylinder of a hydraulically actuated brake mechanism moves axially of an internal rigid member which is not affected by the fluid pressure and an element within such piston which has an extent of free movement axially thereof is adapted to engage with a line of abutments on the rigid member such that after a predetermined degree of excess movement of the piston the extent of retractive movement thereof is limited.

The rigid member which is preferably located concentric with the piston or pistons in a cylinder, conveniently takes the form of a stem or rod at one or each end of which is a series of concentric teeth, preferably formed as a series of concentric truncated cones with their apices directed towards the middle of the rod, which form the abutments with which the element in a piston engages.

The rigid member and its associated piston or pistons are free floating and therefore fully self-compensating, and in addition will automatically self centre where there are two pistons in a cylinder due to the brake shoe return springs.

In order that the invention may be clearly understood and readily carried into effect embodiments thereof are hereinafter more fully described with reference to the accompanying drawing which is given as a non-limitative example and in which:

Figure 1 is a half sectioned side elevation of the cylinder of a hydraulically operated brake with one of its pistons and the automatic adjustment means associated therewith shown in section, Figure 2 is a view similar to Figure 1 of the same mechanism but incorporating means for limiting the degree of self-compensatory movement, Figures 3 and 4 show end and side section views respectively of the elements which engage the toothed or rack rod, Figure 5 is another view similar to Figure 1 showing an alternative form of automatic adjustment means, Figure 6 is a section taken on the line VI—VI of Figure 5 looking in the direction of the arrows, and Figure 7 is a plan view on an enlarged scale looking down on the piston seen in Figure 5.

Referring now to the said drawing, throughout which identical parts bear like reference numerals, and in particular to Figure 1 thereof, 10 is a cylinder of normal design of a hydraulically actuated brake mechanism which is carried by a fixed part and has a centrally located orifice through which fluid flows in and out and by its pressure moves in opposite directions a pair of pistons thereby to rock at least two brake shoes which are retracted by a spring in the normal manner. In the embodiment illustrated each piston is formed of two parts 11, 12 of which the latter partially telescopes into the former to form a chamber 13 and firmly engages the same so that the two parts of the piston move as a whole. The piston has a central bore 14 which is of larger diameter in the portion 11 than in the portion 12 and contains one end of a rod 15 having at each of its ends a series of buttress or conical teeth 16 in the part thereof in the chamber 13 and the larger diameter portion of the bore 14. Each end of the rod 15 terminates in an end portion 17 which is an easy sliding fit in the larger diameter portion of the bore 14. The length of this rod 15 is such that when the pistons are in their normally fully retracted position the outer surface of the part 17 lies flush with the outer surface of the part 11 substantially as illustrated. Within the chamber 13 are two elements 18, 19 (see Figures 3 and 4) of semicircular shape and each having an external peripheral groove 20. The inner periphery of each of the elements 18, 19 is inclined at least over part of the thickness thereof to match the inclination of the teeth 16. The two elements 18, 19 are embraced by an endless coil spring, rubber band or the like 21 which urges the elements 18, 19 into engagement with the teeth 16. The dimensions of the chamber related to the thickness of the elements 18, 19 is such that the elements have a limited degree of free movement in a direction axially of the rod 15 and the arrangement is such that after a predetermined degree of movement of the piston formed by the parts 11, 12 relative to the rod 15, the elements 18, 19 will click over one tooth but will yet permit a degree of retractive movement of the piston due to the play of the elements 18, 19 in the chamber 13. The piston is made fluid tight by a washer 22 which will be provided with a central boss substantially as illustrated to ensure a fluid tight packing around the rod 15, whilst the outer end of each piston engages the end of a brake shoe 23 which it displaces on its movement in the cylinder. As illustrated, the end of the piston directly engages the end of the brake shoe 23 but equally well each piston could engage its associated brake shoe through an intermediate member with like effect.

The brake actuating mechanism above described is fully self-compensating as its two pistons and its rod are freely movable in the cylinder 10. The effect of the elements 18, 19 in co-operation with the teeth 16 and the rod 15 is to provide an automatic compensation by limiting retractive movement of the piston as wear occurs on the brake shoe linings. The limit of such adjustment is reached when the elements 18, 19 abut the end pieces 17.

In the operation of the device the hydraulic fluid moves the pistons away from one another in opposite directions during which the pairs of elements 18, 19 ride part of the way up the teeth with which they are then in engagement as the rod 15 does not move and is not affected by the fluid pressure. On removing the hydraulic pressure the pistons are retracted by the reverse movement of the brake shoes under action of the return springs in the usual manner and during this reverse movement the pairs of elements 18, 19 ride down the teeth with which they are then in engagement. After an amount of wear on the brake linings the consequent greater movement of the brake shoes and hence of the pistons enables the pairs of elements 18, 19 or at least one pair of them to pass over the engaged tooth and as a result the pistons or the one of them cannot now move so far in retractive direction. The possibility of the elements being able to advance a tooth is determined by the wearing down of the brake linings and the necessary degree of retractive movement is permitted by the play of the elements 18, 19 in the chamber 13, and it will be appreciated that the mechanism is sensitive as it is effective at the point of maximum movement of the brake shoes. Furthermore as adjustment may occur on only one piston the adjustment is quite fine and this adjustment of only one piston is not disadvantageous due to the self-compensating characteristic of the design. In addition to their self-compensating characteristic and their automatic adjustment the pistons will also automatically centre themselves during the time that the brake is inoperative.

In some cases it may be desired to centre the toothed rod 15 or prevent it from wandering from central position whilst yet retaining a desirable degree of free movement to provide for automatic compensation. Such an arrangement is illustrated in Figure 2 where the rod 15 is provided with a collar 24 having peripheral flanges between which is located an element 25 which extends in through the wall of the cylinder 10.

In an alternative embodiment of automatic adjustment means which is illustrated in Figures 5, 6 and 7, each piston is formed as a one piece member 26 which has a bore extending only part way therethrough from the inner end thereof. The rod 15 similarly has an end piece 17 slidable in such bore but between such end piece 17 and the outermost tooth is an annular groove or similar recess 27. A pair of parallel bores 28 extend tangentially of and open into the central bore and these bores 28 serve to accommodate the limbs of a U-spring 29 which engage the teeth 16. The portion of the piston 26 between the bores at one end is cut back to accommodate the base of the U-shaped spring 29 and the diameter of the bores 28 and the width of the cut back portion is such that the spring 29, which is desirably flat substantially as illustrated, has a degree of free movement axially of the rod 15. The spring 29 acts equivalently to the elements 18, 19 previously described and on reaching the maximum possible degree of movement its limbs engage the groove 27 and hold the pistons 26 fast with the rod 15, which may be entirely free as described with reference to Figure 1 or given a limited degree of self-centering movement as described with reference to Figure 2. The design described with reference to Figures 5 to 7 is preferred as it is cheaper to make and simpler to assemble than the mechanism described with reference to Figures 1 and 2 with a further additional advantage that with a thin spring the teeth 16 may be of closed pitch and therefore have a greater number of degrees of adjustment.

Each of the embodiments above described may be used as a replacement unit for the existing pair of oppositely acting pistons in a normal hydraulically actuated brake mechanism without requiring any modification of the hydraulic cylinder or the brake mechanism in order to provide for automatic compensation for brake wear and obviate the necessity of using the manually adjustable mechanism such as would be found on such brake mechanism.

I claim:

1. In a hydraulic brake, a cylinder, two opposed pistons in said cylinder, an axial bore in each of said pistons, a rigid member having its ends located in the bores in said pistons, a series of abutments at each end of said rigid member, engagement means capable of limited movement within each of said pistons, and means permitting said engagement means to pass said abutments in one direction only.

2. In a hydraulic brake, a cylinder, two opposed pistons in said cylinder, each piston having a central axial bore, a free rod having its ends located loosely in said bores in said pistons, means for limiting the extent of free movement of said rod, a series of abutments at each end of said rod, means for engaging said abutments to pass the same in only one direction, and means within each of said pistons to contain said engaging means for limited axial movement.

3. In a hydraulic brake, a cylinder, at least one piston located in said cylinder and having a central axial bore therein, a rod terminating in buttress teeth loose in said bore in said piston, a pair of elements embracing and resiliently urged to engage said teeth, and means in said cylinder to contain and permit limited axial movement of said pair of elements.

4. In a hydraulic brake, a cylinder, at least one piston located in said cylinder and having a central axial bore therein, a rod terminating in a plurality of abutments located loose in said bore in said piston, a pair of elements embracing and resiliently urged to engage said abutments, means permitting said elements to pass said abutments in one direction only, means in said cylinder to contain and permit limited axial movement of said pair of elements, and means for limiting the extent of movement of said piston relative to said rod permitted by said elements passing said abutments.

ARTHUR GEORGE TAYLOR.